March 11, 1958 G. F. PFEIFER 2,826,219
HYDRAULICALLY ACTUATED PISTON CONTROLLED VALVE
Filed Nov. 25, 1953 2 Sheets-Sheet 1

INVENTOR.
George F. Pfeifer
BY Victor J. Evans & Co.
ATTORNEYS

March 11, 1958      G. F. PFEIFER      2,826,219
HYDRAULICALLY ACTUATED PISTON CONTROLLED VALVE
Filed Nov. 25, 1953      2 Sheets-Sheet 2
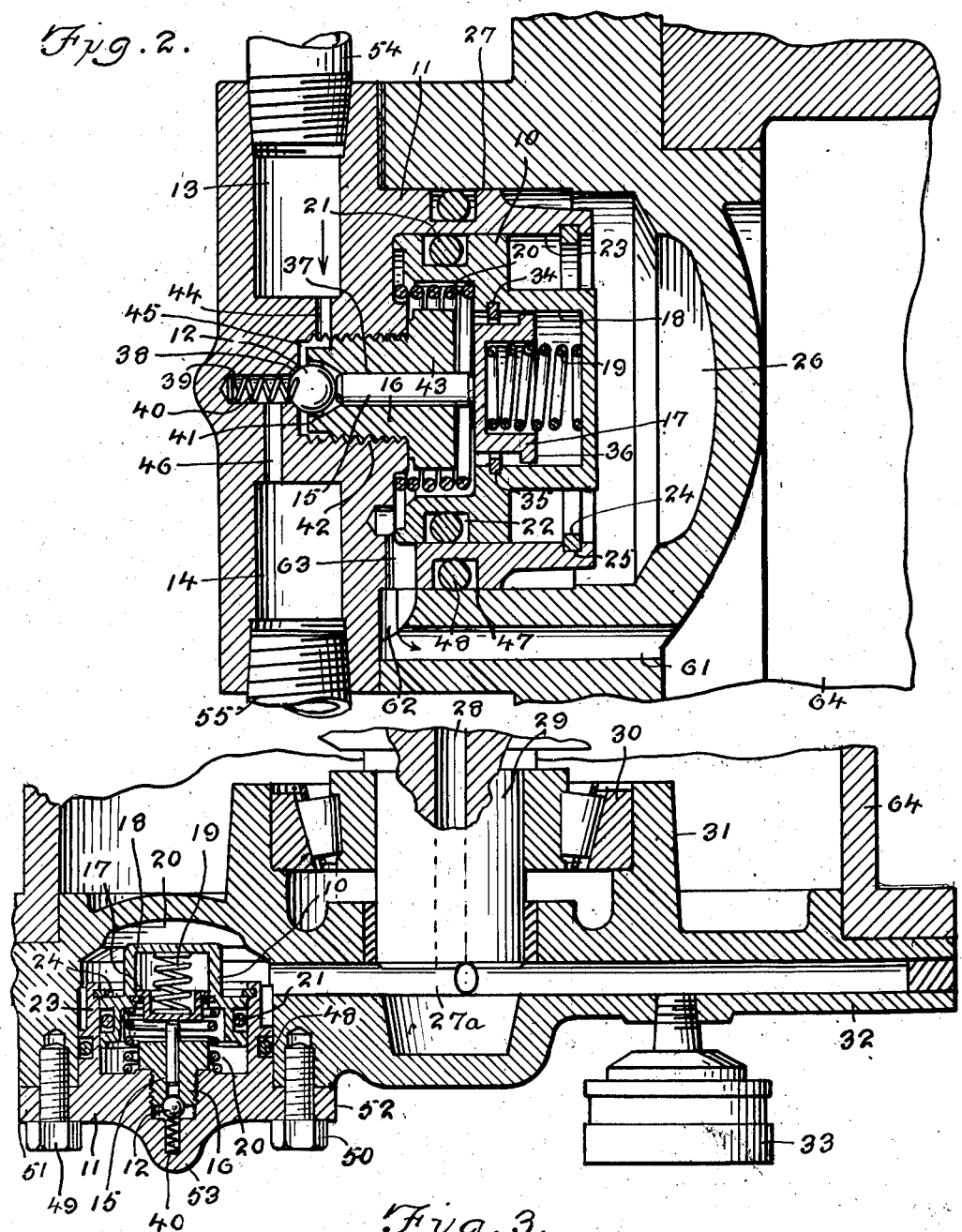
INVENTOR.
George F. Pfeifer
BY Victor J. Evans & Co.
ATTORNEYS

United States Patent Office 2,826,219
Patented Mar. 11, 1958

2,826,219

HYDRAULICALLY ACTUATED PISTON CONTROLLED VALVE

George F. Pfeifer, Quincy, Ill., assignor to Quincy Compressor Company, Quincy, Ill., a corporation of Illinois Application November 25, 1953, Serial No. 394,387

3 Claims. (Cl. 137—625.25)

This invention relates to hydraulically actuated valves particularly adapted for use in fluid pressure lines, such as the air pressure connection of the unloading valve of the air compressor of my Patent No. 2,656,970, and in particular a valve unit including a valve positioned to open and close a connection extended through the valve body with the valve actuated by a piston and with the piston and valve elements incorporated in a housing providing a unit or package wherein the combination of the valve and operating elements therefor are adapted to be inserted in a circular opening in a crank case or other part of an engine, compressor or the like.

The purpose of this invention is to provide a valve assembly wherein the valve and operating parts thereof are self contained or adapted to be installed in a cylindrical housing with the valve positioned in a passage connecting inlet and outlet connections extended through one end of the housing.

With the similar valve of the patent it was necessary to have angular drilling to introduce the oil at the extreme end of the piston, besides the assembling of numerous parts to form the complete valve, making a possibility of error in assembly possible.

With this thought in mind this invention contemplates a valve having a valve body formed of an outer housing with inlet and outlet connections extended through the body and with a piston and resilient operating elements therefor incorporated in the housing.

One object of this invention is, therefore, to provide a complete valve assembly for opening and closing a passage for fluid under pressure and in which the valve is adapted to be actuated by hydraulic means in which the unit is adapted to be inserted in and installed in a cylindrical shaped opening in an end of a crankcase.

The object of this invention is, therefore, to provide an improved hydraulic piston operating three way valve in which the piston and other parts of the valve are incorporated in a self contained housing.

Another object of the invention is to provide a hydraulically actuated valve and housing therefor in which a piston for operating the valve is provided with a peripheral sealing ring and also in which a cylinder in which the piston is operatively installed is also provided with a sealing ring whereby the escape of oil through the opening in which the valve is installed is substantially impossible.

A further object of the invention is to provide an improved three way hydraulic piston control valve in which the valve elements are incorporated in a unitary housing and in which the device is of a comparatively simple and economical construction.

With these and other objects and advantages in view the invention embodies a substantially cylindrical housing having a head with a passage extended therethrough and with a valve positioned in said passage, a piston slidably mounted in the housing and adapted to be moved inwardly by hydraulic pressure and outwardly by a spring and in which a yielding connection is provided between the piston and stem of the valve.

Other features and advantages of the invention will appear from the following description taken in connection with the drawings, wherein:

Figure 2 is a vertical longitudinally disposed section through the valve assembly taken on line 2—2 of Fig. 1 and showing the parts on an enlarged scale.

Figure 3 is a sectional plan through the valve assembly and adjoining portion of the compressor, said section being taken on line 3—3 of Fig. 1 with the compressor at rest, or in the unloaded position, and with the parts shown on an enlarged scale.

Figure 1:
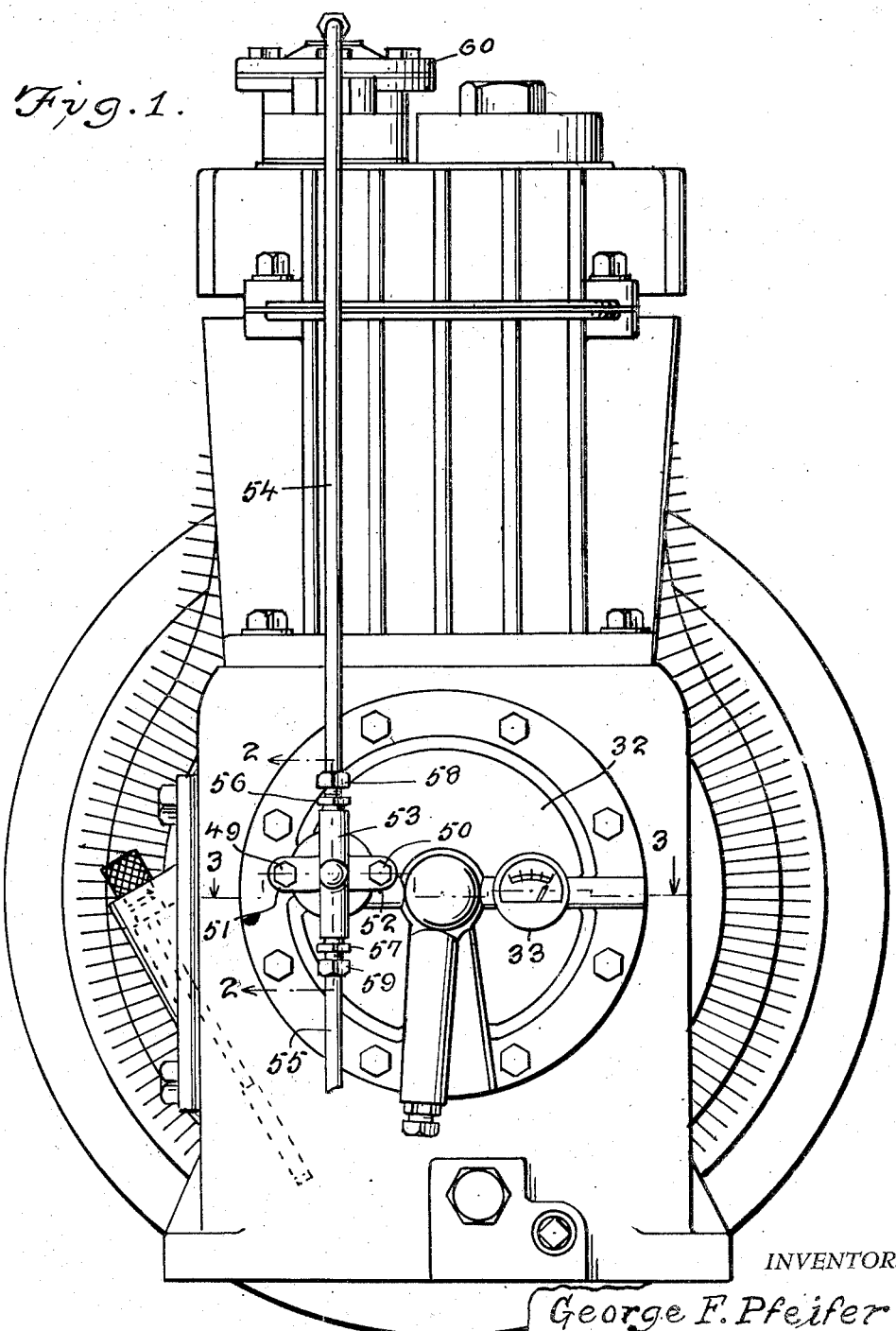
Figure 1 is an end elevational view of an air compressor illustrating the location of the improved hydraulically actuated valve thereon.

Referring now to the drawings wherein like reference characters denote corresponding parts the improved hydraulically actuated piston controlled valve of this invention includes a piston 10 mounted in a cylindrical housing 11 with a ball valve 12 positioned in a passage having inlet and outlet connections 13 and 14 adapted to be actuated by a stem or pin 15 in a bushing or plug 16, the end of the stem being positioned to engage a floating cup 17 in a cylinder or cylindrical opening 18 in the extended end of the piston 10, the cup being held by a spring 19 and the piston being urged outwardly of the housing 11 with a spring 20.

The piston 10, which is provided with a sealing ring 21 that is positioned in an annular recess 22 is mounted to slide longitudinally in a cylinder 23 of the housing 11. The piston is urged outwardly by the spring 20 and outward movement of the piston is limited by an annular spring ring 24 in a recess 25 in the wall of the housing 11.

The piston 10 is retained in the position shown in Fig. 2 by oil or other fluid under pressure in the chamber 26 at the inner end of the cylindrical opening 27 in which the housing 11 is positioned, the chamber 26 being connected by a passage 27a to a passage 28 through a crank shaft 29, as illustrated in Fig. 3. In this figure the end of the crank shaft is illustrated as being retained in a bearing 30 in a hub 31 extended from an end plate 32 in which the passage 27a, chamber 26 and opening 27 are provided. The end plate may be provided with a pressure gauge 33, or the like.

The piston 10 is also provided with an inner annular recess 34 in which a spring ring 35 for retaining the cup 17 in the piston, is mounted, the ring 35 being positioned to engage a flange 36 extended around the open end of the cup.

The cup 17 engages the inner end of the valve stem 15 which is slidably mounted in a bore 37 of the bushing 16 whereby the ball is retained against a seat 38 in the outer portion of the housing 11.

The outer end of the housing 11 is provided with a socket 39 in which a spring 40 is positioned, and as shown in Fig. 2 the spring 40 urges the ball 12 into a counterbore 41 around the end of the bore 37 in the bushing 16. The bushing 16, which is threaded into an opening 42 in the housing 11 is provided with a head 43 that is formed with flat sides to provide a nut to facilitate turning the bushing.

The connection 13, in one side of the housing 11 is provided with a passage 44 that connects the connection 13 to a recess 45 in the housing and a similar passage 46, at the opposite side provides communicating means between the recess 45 and the connection 14.

The outer surface of the housing 11 is provided with an annular recess 47 in which a sealing ring 48 is positioned and, as shown in Fig. 1, the housing 11 is secured in the cylinder or opening 27 with bolts 49 and 50 that extend through flanges 51 and 52, respectively on the outer end of the housing.

The connections 13 and 14 are provided in an arcuate portion 53, also at the outer end of the housing and, as illustrated in Figure 1 the connections 13 and 14 are provided with tubes 54 and 55, respectively that extend through packing glands 56 and 57 and that are provided with lock nuts 58 and 59, respectively.

The tube 54 which extends from one of the connections extends to an unloading valve, as indicated by the numeral 60 on a cylinder of the compressor.

The end plate 32 is provided with a return passage 61 that is connected by an opening 62 to a passage 63 in the housing 11 whereby oil or other fluid leaking by the piston or cylindrical portion of the housing flows back to the crankcase, which is indicated by the numeral 64.

With the compressor at rest, the valve assumes the position, as per Figure 3, air having been admitted through tube 55 the ball having seated on counterbore 41, whereby air flows up through tube 54 to unloading valve 60 in the compressor head. Upon starting, fluid pressure builds up in chamber 26 by means of pump, not shown, driving the piston 10 inwardly, of the housing, to the position shown in Figure 2, whereby the ball is retained against the seat 38 and the passage through tube 55 is closed. The air trapped in the unloader valve of the compressor head is then permitted to escape past the ball 12 and between stem 15 and bore 37. The clearance between stem 15 and bore 37 is purposely made small so as to retard or slow down the escape of air from the unloader valve in the head of compressor until the compressor builds up speed.

By this means the pistons of the compressor may reciprocate freely in starting and assume their loads only after the compressor reaches a predetermined speed. Upon slowing down of the compressor the spring 20 returns the piston 10, thereby opening the valve and permitting the fluid under pressure to flow to the unloading valve which opens, relieving the working load of the piston.

It will be understood that modifications, within the scope of the appended claims, may be made in the design and arrangement of the parts without departing from the spirit of the invention.

What is claimed is:

1. In a hydraulically actuated valve, the combination which comprises a housing having a cylindrical opening extended inwardly from one end with a passage having inlet and outlet connections at opposite ends thereof extended through the housing and positioned normal to the cylindrical opening, a valve in the passage between said inlet and outlet connections, a piston having a cylindrical opening therein positioned in the cylindrical opening of the housing, means for limiting outward movement of the piston in the housing, resilient means urging the piston outwardly of the housing, a cup slidably mounted in the cylindrical opening of the piston, resilient means positioned between the piston and cup, a valve stem slidably mounted in the housing and positioned between the cup and valve for actuating said valve by the cup.

2. In a hydraulically actuated valve, the combination which comprises a housing having a cylindrical opening extended inwardly from one end with a passage having inlet and outlet connections at opposite end thereof extended through the housing and positioned normal to the cylindrical opening, a valve having a ball positioned to coact with a valve seat in the passage between said inlet and outlet connections, a piston having a cylindrical opening therein positioned in the cylindrical opening of the housing, means for limiting outward movement of the piston in the housing, resilient means urging the piston outwardly of the housing, a cup slidably mounted in the cylindrical opening of the piston, resilient means positioned between the piston and cup, a bushing having a bore extended therethrough threaded in the housing and positioned with the axis thereof aligned with the piston and valve, a stem slidably mounted in the bore of the bushing and positioned to engage the cup of the piston at one end and the ball of the valve at the other, and resilient means for urging the ball of the valve against the stem to open the valve.

3. In a pressure actuated valve, the combination which comprises a cylindrical housing for use on an air compressor, said cylindrical housing having a transversely disposed passage extended therethrough, a valve in said passage and positioned on the axis of the cylindrical housing, a plug in the housing having a bore in alignment with the valve, a pin in the bore of the plug for holding the valve closed, a piston having a cylindrical opening therein slidably mounted in the cylindrical housing, a spring in the housing for urging the piston outwardly thereof, a stop in the housing for limiting outward movement of the piston, a floating cup slidably mounted in the cylindrical opening of the piston, and a spring between the cup and piston for urging the cup from the piston, said cup being positioned to engage the pin slidably mounted in the plug to urge the pin into holding relation with the valve, and means for limiting the travel of the cup in the piston.

References Cited in the file of this patent
UNITED STATES PATENTS

| 1,339,513 | Ingersoll | May 11, 1920 |
| 1,406,026 | Jensenius | Feb. 7, 1922 |
| 1,623,431 | McVoy | Apr. 5, 1927 |
| 2,296,132 | Wiseley | Sept. 15, 1942 |
| 2,456,084 | Ray | Dec. 14, 1948 |
| 2,666,451 | Ray | Jan. 16, 1954 |